(12) United States Patent
Lichtenwalner, Jr. et al.

(10) Patent No.: US 12,419,210 B2
(45) Date of Patent: Sep. 23, 2025

(54) FURROW VISUALIZATION

(71) Applicant: Deere & Company, Moline, IL (US)

(72) Inventors: Houstin L. Lichtenwalner, Jr., Emmaus, PA (US); Bran Ferren, Los Angeles, CA (US); Don Lariviere, Glendale, CA (US); Cary S. Hubner, Geneseo, IL (US)

(73) Assignee: Deere & Company, Moline, IL (US)

( * ) Notice: Subject to any disclaimer, the term of this patent is extended or adjusted under 35 U.S.C. 154(b) by 548 days.

(21) Appl. No.: 17/949,852

(22) Filed: Sep. 21, 2022

(65) Prior Publication Data

US 2024/0090363 A1 Mar. 21, 2024

(51) Int. Cl.
*A01B 79/00* (2006.01)
*A01C 5/06* (2006.01)

(52) U.S. Cl.
CPC ............ *A01C 5/068* (2013.01); *A01B 79/005* (2013.01)

(58) Field of Classification Search
CPC ......... A01B 79/005; A01B 79/02; A01C 5/00; A01C 5/068
See application file for complete search history.

(56) References Cited

U.S. PATENT DOCUMENTS

| | | | |
|---|---|---|---|
| 11,503,756 B2* | 11/2022 | Cozza | A01B 63/1112 |
| 2018/0128933 A1 | 5/2018 | Koch et al. | |
| 2020/0068778 A1* | 3/2020 | Schoeny | A01C 7/203 |
| 2021/0298216 A1* | 9/2021 | Kovach | A01B 63/008 |
| 2022/0348322 A1* | 11/2022 | Zemenchik | B64D 47/00 |
| 2022/0377967 A1* | 12/2022 | Thompson | A01C 7/203 |
| 2023/0320251 A1* | 10/2023 | McClelland | A01B 79/005 56/6 |

FOREIGN PATENT DOCUMENTS

| | | |
|---|---|---|
| WO | WO 2019/099748 A1 | 5/2019 |
| WO | WO 2023/158569 A1 | 8/2023 |

OTHER PUBLICATIONS

Extended European Search Report and Written Opinion issued in European Patent Application No. 23195874.5, dated Feb. 16, 2024, in 09 pages.

* cited by examiner

*Primary Examiner* — Jamie L Mcgowan
(74) *Attorney, Agent, or Firm* — Tucker Ellis LLP

(57) ABSTRACT

One or more techniques and/or systems are disclosed for furrow analysis and visualization. A system for furrow visualization includes a radar sensor configured to be coupled to a planting vehicle and acquire data relating to a furrow being created, and a visualization apparatus communicatively coupled to the radar sensor and configured to generate a point cloud of the furrow. The system further includes a furrow analyzing processor configured to analyze the point cloud and generate a visualization of the furrow.

19 Claims, 11 Drawing Sheets

FURROW VISUALIZATION

BACKGROUND

Agricultural planters and/or seeders, such as air carts and other work vehicles/devices, are configured for applying seed, fertilizer, and/or other particulate commodities to a field. The planters or seeders that meter out a predetermined quantity of a commodity as the work vehicle moves across the field. Ground openers are used and may be ground following members that create a furrow in soil, by locally excavating soil from a location desired for seed placement, that then allows for placing a seed into the furrow, and folding the excavated soil back over the furrow, thus burying (i.e., planting) the seed.

In order to assess the performance of planters or seeders, operators pause the planting or seeding process (e.g., stop the vehicle) and manually dig into the soil to physically measure planting depth and "eyes-on" observe seedbed quality. This process can be time consuming and cumbersome, vary due to inconsistencies and subjectiveness, and are used to assess a small fraction of the planted seeds as a representative sample for an entire field.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for furrow analysis and visualization. In one implementation, a system for furrow visualization comprises a radar sensor configured to be coupled to a planting vehicle and acquire data relating to a furrow being created, and a visualization apparatus communicatively coupled to the radar sensor and configured to generate a point cloud of the furrow. The system further comprises a furrow analyzing processor configured to analyze the point cloud and generate a visualization of the furrow.

In another implementation, a planting device comprises a frame, a plurality of seeding units coupled to the frame, and a radar sensor coupled to an undercarriage of one or more units of the plurality of seeding units and configured to acquire data relating to a furrow being created. The planting device further comprises a visualization apparatus communicatively coupled to the radar sensor and configured to generate a point cloud of the furrow using the acquired data. The planting device further comprises a furrow analyzing processor configured to analyze the point cloud and generate a visualization of the furrow.

In another implementation, a method for furrow analysis and visualization comprises projecting a radar beam under a planting vehicle creating a furrow, receiving velocity information for the planting vehicle, and capturing a point cloud of the furrow using the radar beam with a velocity component based on the velocity information. The method further comprises determining one or more features of the furrow using the captured point cloud and generating a visualization of the furrow based on the determined one or more features.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

DETAILED DESCRIPTION

Figure 1:
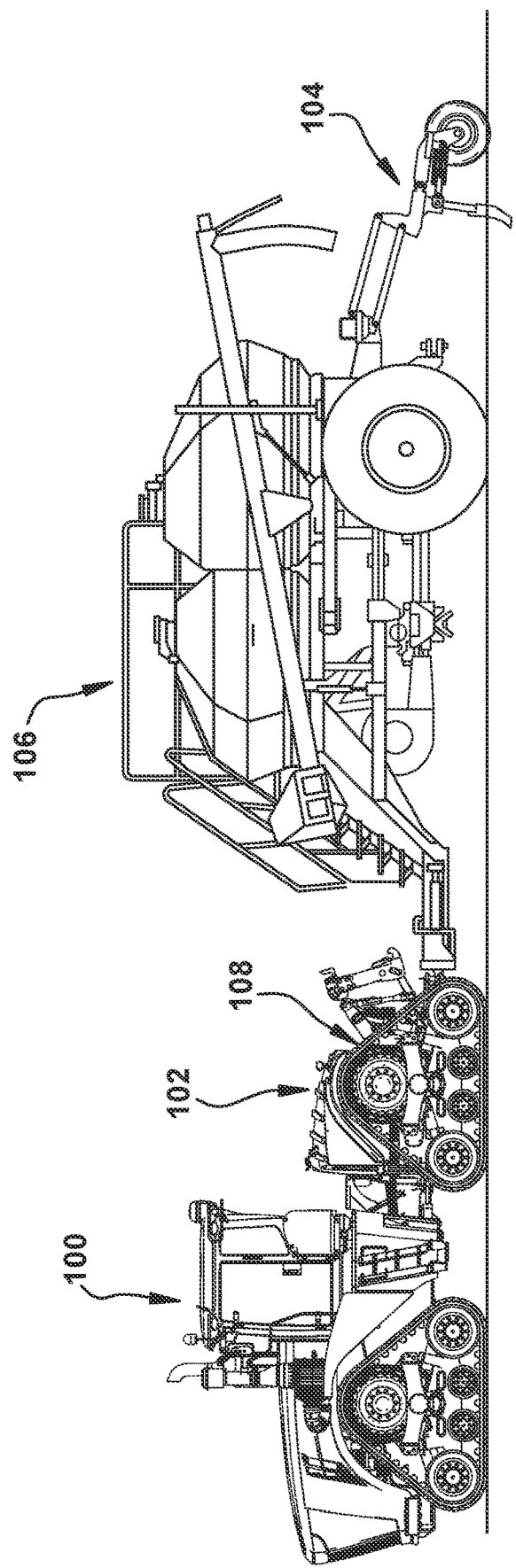
FIG. 1 is a perspective view of an agricultural seeding arrangement in which various examples can be implemented.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The methods and systems disclosed herein, for example, may be suitable for use in different seeders and seed delivery or metering applications (e.g., different types of volumetric metering applications) for furrow analysis and visualization. That is, the herein disclosed examples can be implemented in different planting vehicles or seeders other than for particular types of seeds and/or delivery systems, such as other than for specific farm vehicles for particular planting or seeding applications. In some examples, the herein disclosed examples are implemented with a seeder for seeding grains (e.g., wheat, barley, oats, canola, peas, lentils, etc.) that allows for furrow analysis and visualization during the planting of the seeding grains. That is, one or more herein described furrow visualization techniques for seed depth monitoring, soil characterization, and/or fertilizer application can be used with different planter or seeder systems and that use various types of frequency/wavelength regimes or other signaling based techniques to determine furrow and/or seed properties.

FIG. 1 is a component diagram illustrating an example implementation of a system that may utilize one or more portions of the aspects and examples described herein. In the implementation illustrated in FIG. 1, a vehicle 100, illustrated as a tractor, can perform different operations, such as a ground working operation in a field (e.g., air seeding) using different tools or implements. In some implementations, the vehicle 100 has track systems 108 installed thereon. In other implementations, the vehicle 100 has wheels instead of track systems installed on the rear or both the front and rear of the vehicle 100. It should be noted that while various examples are described in connection with a tractor having a particular configuration, the systems and methods described herein may also be utilized with other types of vehicles and implements.

The vehicle 100 in some examples includes a chassis 102, which provides attachment points for the vehicle 100. For example, a work tool can be connected to the front or back of the chassis 102. The work tool is movably connected to the chassis 102 in some examples. In the illustrated example, the work tool is an air seeder 104 coupled to an air cart 106, which is coupled to the chassis 102. In some examples, the air seeder 104 can be any type of air tool configured to perform air seeding, such as configured as an air drill, or other type of agricultural seeding machine.

Figure 3:
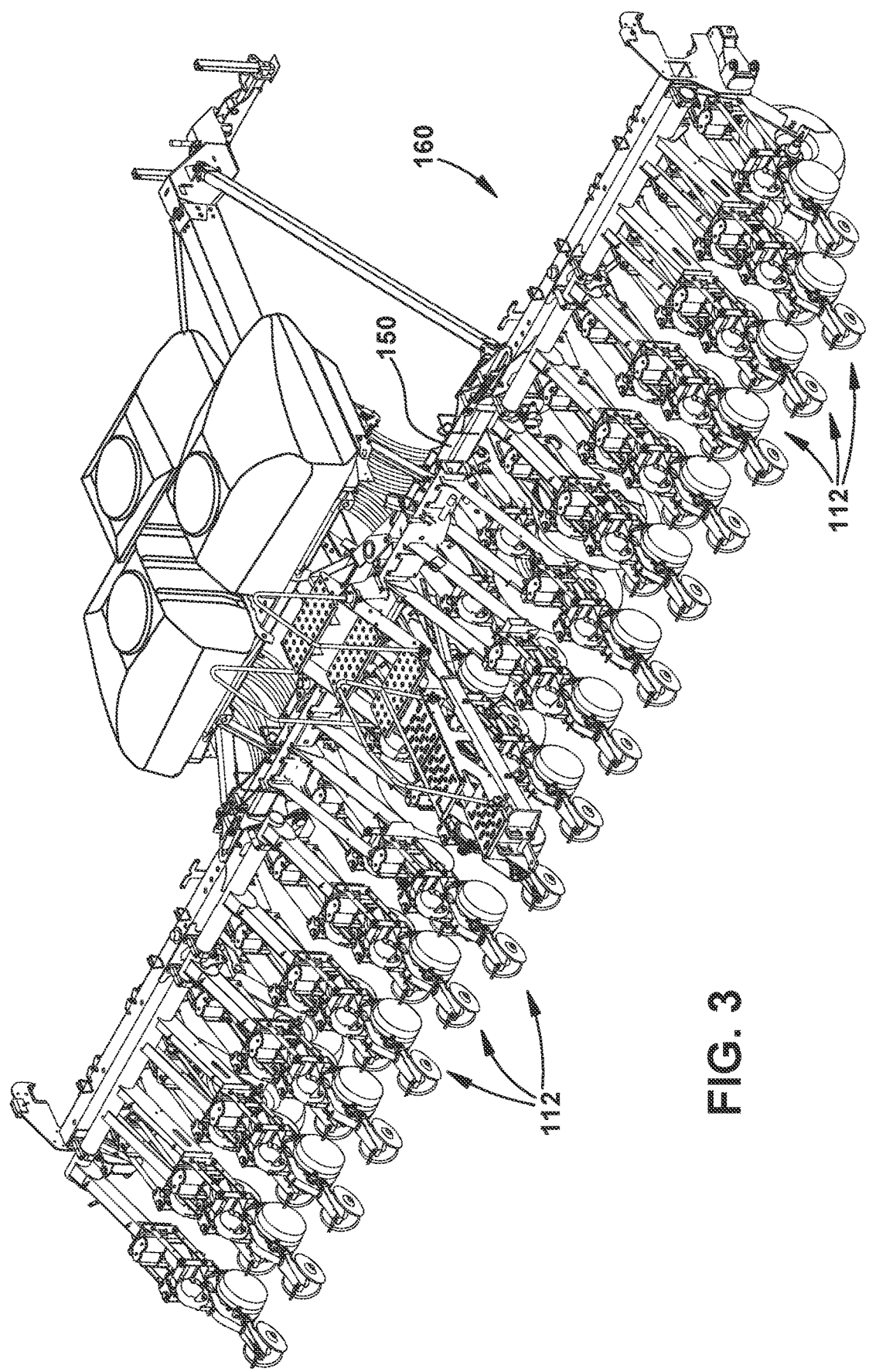
FIG. 3 is a component diagram illustrating a planter according to one implementation.

In one example, the air cart 106 is configured as part of an agricultural seeding machine or planter that includes a frame 110 on which are mounted a plurality of individual seeding units 112 (see also FIG. 3). In some examples, each seeding unit 112 is coupled to a tool frame 150 (e.g., frame of the air seeder 104) towed by the vehicle via a rear tow bar 144 and having a linkage so that the individual seeding units 112 can move up and down to a limited degree relative to the frame 110 (e.g., the tow bar 144 allows for pulling the air cart 106 behind the tool, such as the air seeder 104). A plurality of storage tanks 114 (e.g., commodity containers) hold commodity such as seed or fertilizer that is delivered pneumatically to a mini-hopper on each seeding unit 112 in various examples.

Figure 2:
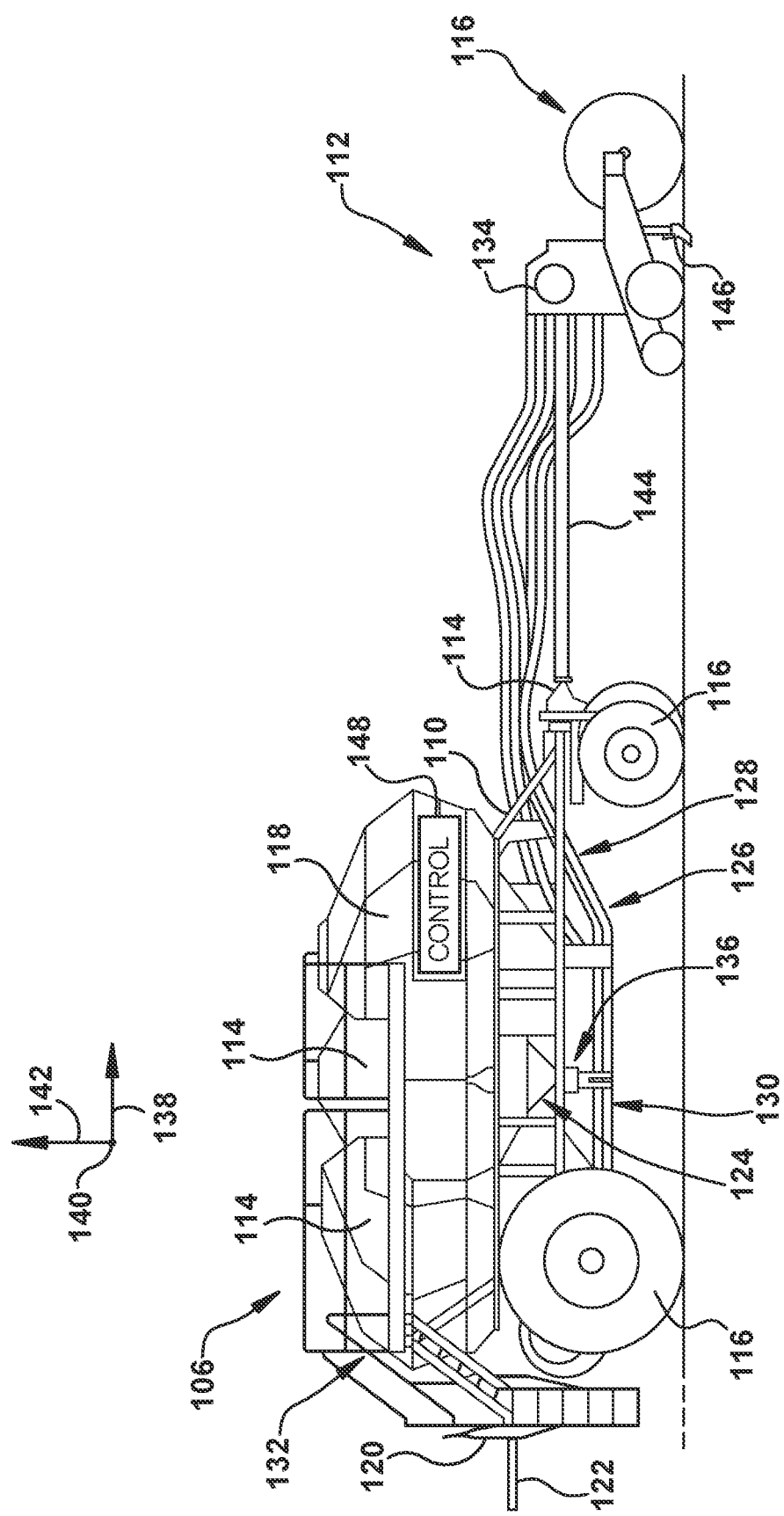
FIG. 2 is a component diagram of an agricultural seeding machine in which various examples can be implemented.

Each seeding unit 112 is configured to form an open furrow in the soil beneath the seeding machine into which seed is deposited (e.g., air seeding). Other components, such as ground engaging members (e.g., tines or other ground openers 146), closing members, and packing wheels are also mounted to and form part of the seeding units 112, and are operable to open and close the furrow over the deposited seed and to firm the soil in the closed furrow. In one particular implementation as shown in FIG. 2, the air seeder 104 includes the frame 110 (e.g., chassis) movable with a plurality of wheels 116. It should be noted that the air cart 106 also includes a plurality wheels 116 in various examples. It should be noted that different tire options can be implemented, for example, to accommodate row widths and reduce soil compaction.

The frame 110 can be assembled from rigid beams, bars, brackets, or other structures and may support the components as disclosed herein. In operation, one or more of the wheels 116 support the frame 110 on terrain and enable movement of the various components across the terrain. As shown, the frame 110 extends between a front end 118 (e.g., first end) and a rear end 120 (e.g., second end) of the agricultural seeding machine arrangement. A tow bar 122 extends from the frame 110 at the rear end 120 for attaching (e.g., towing), a liquid fertilizer dispenser or anhydrous ammonia fertilizer dispenser behind the air cart 106. It should be noted that different configurations of the air seeder 104 are contemplated, including, but not limited to: 1. Row units (e.g., rows of seeding units 112) mounted on a folding frame supplied by a tank mounted on a center section of the same frame; 2. Row units mounted on the folding frame supplied by the air cart 106 towed behind the tool frame (e.g., arranged as the vehicle 100 followed by the air seeder 104 (the tool), followed by the air cart 106); and 3. Row units mounted on the folding frame supplied by the air cart 106 that is between the vehicle 100 and the tool, namely the air seeder 104 (e.g., the vehicle 100, followed by the air cart 106, followed by the air seeder 104). That is, FIG. 1 illustrates a "tow between" or leading configuration, and FIG. 2 illustrates a "tow behind" or trailing configuration.

As can be seen, the storage tanks 114 are supported on the frame 110. The storage tanks 114 contain seed, fertilizer, and/or another particulate or granular commodity. Additionally, in some examples, the storage tanks 114 include a liquid commodity. There may be any number of storage tanks 114 (e.g., four storage tanks).

Additionally, the air cart 106 further includes at least one metering system 124. The metering system 124 in some examples is a volumetric metering system. The metering system 124 is configured to receive commodity from the storage tanks 114 and meter commodity to a downstream component. In some examples, the metering system 124 is supported by the frame 110 and is disposed generally underneath the storage tanks 114. The metering system 124 in various examples includes a plurality of metering roller assemblies (e.g., knob, element, shaft, and coupler) that actuate (e.g., rotate) to meter out the commodity from the storage tanks 114. During operation, particles of the commodity within one of the storage tanks 114 moves vertically downward toward the metering system 124. The metering system 124 operates to meter out the commodity from the storage tanks 114 at a predetermined, controlled rate as the air cart 106 and the trailing air seeder 104 move across the field.

A delivery system 126 is also provided. The delivery system 126 include at least one delivery run 128. The delivery run(s) 128 define a fluid pathway for delivery of the commodity away from the air cart 106. In some examples, the plurality of the runs 128 include a respective run structure 130 (e.g., a primary tube or pipe) that is supported below the metering system 124. The run structures 130 in some examples are rigid pipe segments that are fixed to the frame 110. The run structures 130 are in fluid communication with downstream components (e.g., downstream pipe segments in the respective run 128, downstream manifolds, and/or rows of seeding units 112).

For example, the runs 128 conduct a flow of air from the rear end 120 to the front end 118 and away from air cart 106. Airflow within the runs 128 in some examples is generated by one or more fan(s) or other source(s) 132 mounted on the rear end 120 of the air cart 106. The one or more blowers (e.g., fan(s)) or other source(s) 132 provide one or more source(s) of flowing fluid(s) at one or more different pressure (s) as may be necessary and/or desired to carry the one or more different commodities to the rows of seeding units 112. In some examples, a first run structure defines a first run passage configured to receive an associated first fluid flowing from an associated first source 132 at a first pressure, a second run structure defines a second run passage configured to receive an associated second fluid flowing from an associated second source 132 at a second pressure, a third run structure defines a third run passage configured to receive an associated third fluid flowing from an associated third source 132 at a third pressure, etc.

The runs 128 are operably connected with the metering system 124 such that particles of the commodity (e.g., seeds) metered out by the metering system 124 are received by selected ones of the runs 128. In some examples, the particles move substantially vertically downward into the selected runs 128. Once in the runs 128, the air stream therein propels the metered particles away from the air cart 106 and toward the rows of seeding units 112.

In some examples, at least one of the runs 128 of the delivery system 126 are operably connected with a downstream metering system 134. As shown in FIG. 2, the downstream metering system 134 can be supported by the rows of seeding units 112. It should be appreciated that the plurality of rows of seeding units 112 can include respective downstream metering systems 134. Additionally, in some examples, some rows of seeding units 112 include a respective downstream metering system 134 and others may not.

Furthermore, the delivery system 126 include at least one manifold regulator 136. The manifold regulator 136 is supported by the frame 110 in some examples. The manifold regulator 136 is operably disposed between the metering system 124 and two or more of the run structures 130, and between the pressure sources 132 and the storage tanks 114. In some implementations, the manifold regulator 136 is configured for selectively changing the pathway for the commodity from a first storage tank 114 through a selected one of the delivery runs 128 by movement of a valve member relative to a body member of a commodity valve, and simultaneously also for automatically delivering pressure to the first storage tank 114 supplying the commodity in accordance with the selected delivery run pathway selected. For example, the manifold regulator 136 can be manually or automatically moved to select a first position of the valve member relative to the body in which commodity metered from the metering system 124 is payed out from a first storage tank 114 to a first one of the runs 128 for delivery to a respective row of seeding units 112. The manifold regulator 136 can further be manually or automatically moved to select a second position of the valve member relative to the body in which commodity metered from the metering system 124 is metered out from the first storage tank 114 to a second one of the runs 128 for delivery to a different row of seeding units 112.

In operation, the air cart 106 according to the illustrated example is configured to be towed by another vehicle, such as a tractor (e.g., the vehicle 100 shown in FIG. 1). In other examples, the air cart 106 is a self-propelled vehicle. In some examples, the air cart 106 (e.g., air drill) is part of or operates in combination with any type of agricultural seeding machine that contains a bulk amount of a commodity, which meters out the commodity from the bulk amount, and moves the metered commodity away from the air cart 106 for planting in the ground. In some examples, the commodity delivered from the air cart 106 is metered further downstream before being planted using one or more seed metering configurations. The air cart 106 and air seeder 104 with the rows of seeding units 112 are merely an example where one or more portions of various examples may be implemented. One or more features of the various examples may be included on a different work vehicle, such as a planter, a commodity cart, or other work vehicle without departing from the scope of the present disclosure.

It should be noted that in the illustrated example, a longitudinal axis 138 (e.g., primary axis) is indicated for reference purposes. The longitudinal axis 138 may be substantially parallel to a direction of travel of the air cart 106. Thus, the longitudinal axis 138 may be parallel to the fore-aft axis of the air cart 106. A lateral axis 140 is also indicated in FIG. 2. The lateral axis 140 is perpendicular to the longitudinal axis 138 and extends between opposite lateral sides of the air cart 106. Furthermore, a vertical axis 142 is indicated in FIG. 2 for reference purposes. In some examples, a control unit 148 can be used to control operations of one or more portions of the air cart 106. For example, the control unit 148 comprises one or more microprocessors that utilize commands and/or programs to operate the example air cart 106.

In some examples (see also FIG. 3), a planter 160 and/or the air cart 106 with the air seeder 104 together define an agricultural planter or seeding machine that is configured for delivering the commodity with the one or more rows of seeding units 112. Each row unit of the rows of seeding units 112, thus, includes features for respectively tilling the soil, opening a furrow in the soil, depositing the commodity into the furrow, firming the furrow, and closing the furrow. In some examples, the rows of seeding units 112 are connected together and arranged in series along the lateral axis 140. It should be noted that although only one row of seeding units 112 is shown in FIG. 2, it should be appreciated that similar rows of seeding units 112 can be included and disposed in series along the lateral axis 140 (see FIG. 3). The rows of seeding units 112 are connected with the air cart 106 via the rear tow bar 144. Accordingly, the rows of seeding units 112 are disposed behind the air cart 106 and the towing vehicle with respect to the longitudinal axis 138 in various examples. However, the rows of seeding units 112 can be disposed between the air cart 106 and the towing vehicle in some examples and/or the rows of seeding units 112 can be directly connected with the air cart 106 (e.g., directly connected with the frame 110 of the air cart 106) without departing from the scope of the present disclosure.

Various examples allow analysis and visualization of the furrow using a radar frequency regime for sensing, particularly sensing within a millimeter-wave range of frequencies, and determining one or more of furrow characteristics that may include, but are not limited to, amounts of debris, seed placement, fertilizer placement, furrow shape, and furrow depth, among others. As a result, various examples improve the quality of seeding, resulting in improved crop yield, such as from improved emergence consistency. In one or more examples, a contact-free, automatic assessment is also performed in real time of one or more seed planting factors, including, but not limited to: a seed's final resting place, spacing between planted seeds, depths of the planted seeds, furrow integrity (which may be represented by a desirable furrow shape and structure), and seed to soil contact (which may be represented by seedbed quality metrics indicating soil content materials). For example, it is contemplated that seed to soil contact can be estimated by establishing a ratio of soil to debris, wherein higher percentages of debris (i.e., MOG, or refuse or residue) may indicate that the soil contains an abundance of debris and thus a planted seed is not resting in contact with soil, but instead resting in contact with debris matter.

Figure 4:
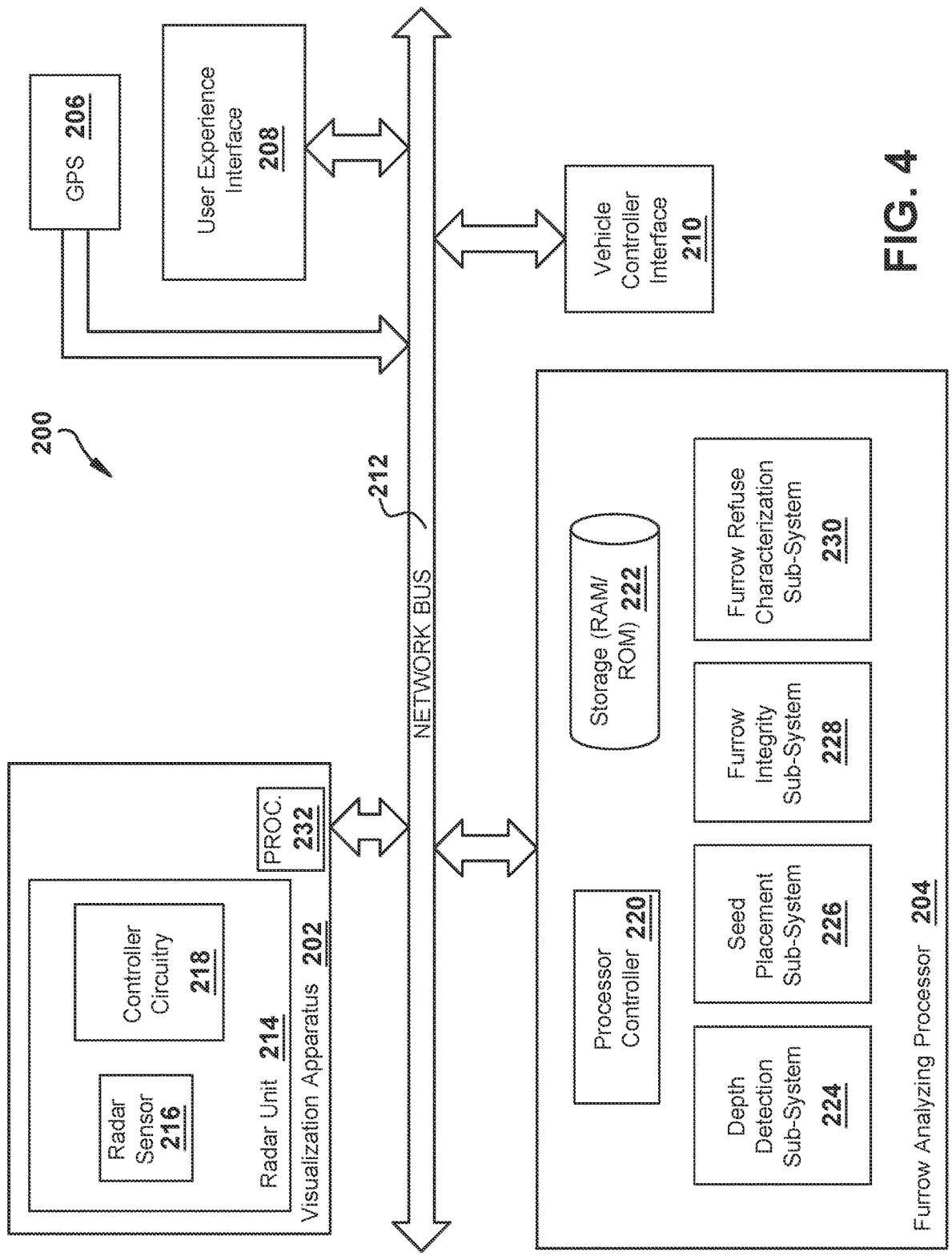
FIG. 4 is a block diagram of a system for furrow analysis and visualization according to one implementation.

In some examples, a system 200 as illustrated in FIG. 4 is configured to perform furrow imaging and analysis that enable users to assess, for example, a seed's pose and/or final resting place, consistency over the long of the furrow, a spacing between planted seeds, depths of the planted seeds, furrow integrity, and seed to soil contact by way of soil content characterization, among other factors or characteristics. That is, the system 200 is configured to perform furrow imaging and analysis, which further provides contact-free and automatic assessment of a seeding process in real time and/or offline. For example, furrow imaging and analysis allows for (i) determining seed placement within a furrow during planting, (ii) estimating planting depth of planted seeds, (iii) determining furrow shape and furrow structure estimation metrics, and/or (iv) estimating seedbed content metrics. In some examples, a notification is provided to an operator of seed, furrow, and/or seedbed metrics, as well as allows for location-based field registration and mapping. In operation, in response to determined furrow and/or seeding metrics, automatic adjustment(s) of planter or seeder components is performed in some examples. As such, the system 200 is configured to obtain and generate seed planting related metrics that can be used as feedback in real-time and/or offline to inform a planting operator of actionable responses, inform a planting operator of hysteresis, and/or automate planting vehicle adjustments and thereby close the loop on the planting process based on real-time planting quality assessment.

In the illustrated example, the system 200 is configured as a visualization and analysis system, particularly a furrow visualization and analysis system, which can form part of or be coupled to the vehicle 100 (or other planting vehicle), wherein the system 200 includes a visualization apparatus 202, operably coupled to a programmed processor, illustrated as a furrow analyzing processor 204. In some examples, the system further includes a GPS device 206, a user interface, illustrated as a user experience interface (UI) 208, and a vehicle controller interface 210, communicatively and/or operably coupled as illustrated via a network bus 212. In the illustrated example, the visualization apparatus 202 further includes a radar unit 214 as described in more detail herein. In some examples, the radar unit 214 is configured as a radar emitter/receiver unit that collects photons and/or measures waves.

Figure 5:
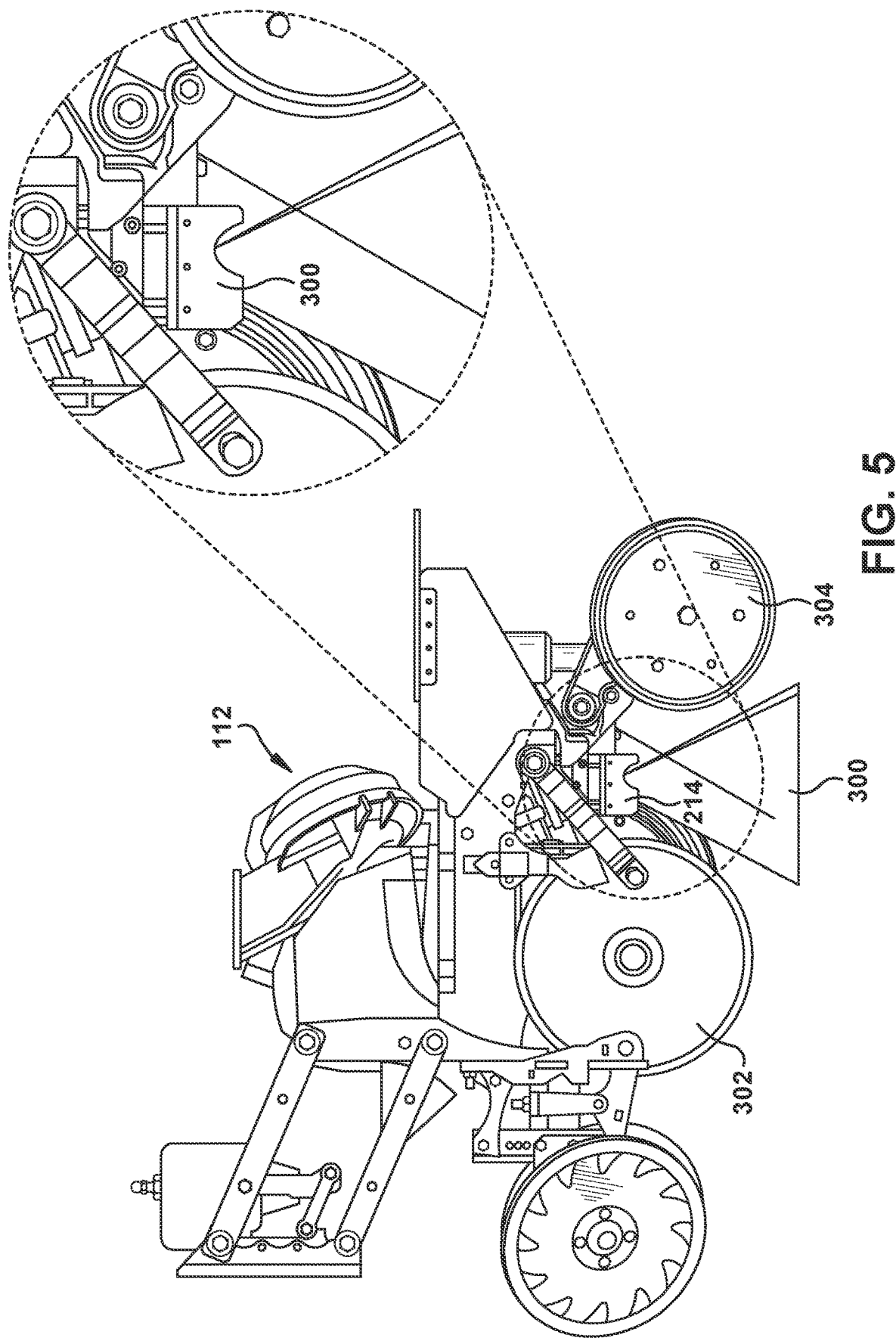
FIG. 5 is a diagram illustrating a radar arrangement for a planting device or vehicle according to one implementation.

In some examples, the visualization apparatus 202, which can be configured as an imaging apparatus, is fixedly coupled to an undercarriage portion of the planting device (e.g., the seeding unit 112 as illustrated in FIG. 5), such as between a furrow opening mechanism 302 and a furrow closing mechanism 304 (e.g., closing wheel) of the planting device, wherein an imaging axis of the radar unit 214 is perpendicular to the ground. However, angled orientations are also contemplated, such as angularly offset from the perpendicular axis by an angle (0) such that an electromagnetic (EM) energy aperture 300 of the radar unit 214 encompasses a different area under the undercarriage portion (e.g., in front of or behind the radar sensor 216).

In various examples, the radar unit 214 is configured to perform radar sensing using a radar frequency regime for sensing, particularly sensing within a millimeter-wave range of frequencies, and determining one or more of furrow characteristics that may include, but are not limited to, amounts of debris, seed placement, fertilizer placement, furrow shape, and furrow depth. That is, the radar unit 214 acquires visualization information, such as to determine one or more structure, shape, and/or soil composition characteristics of a created furrow.

In some examples, the radar unit 214 further includes a radar sensor 216 or other radar sensing apparatus. For example, the radar sensor 216 is a radar device operating in the millimeter-wave range of frequencies (e.g., a millimeter wave sensor, such as the IWR 6843 millimeter wave sensor chip available from Texas Instruments), such as within the 60 gigahertz (GHz) to 64 GHz frequency range. However, it should be appreciated that the radar sensor 216 is not limited to this operating range and can operate within different frequencies within the millimeter frequency range, such as between 30 GHz and 300 GHz. In some examples, the radar sensor 216 is operable in other frequency ranges, such as non-millimeter wave frequencies. That is, the radar sensor 216 can comprise a plurality of sensors and sensor types. In one or more examples, such as when using 60 GHz radar sensing, discrete point clouds for objects at about five millimeters (mm) are generated and used in the furrow analysis as described in more detail herein. It should be noted that the radar sensor 216 can be monostatic (having an integrated transmitter and receiver) or bi-static (having a separate transmitter and receiver).

In the illustrated example, the radar unit 214 further includes controller circuitry 218 configured to control operation of the radar sensor 216 and other components of the radar unit 214, including to synchronize with when a seed is placed, for frame rate control, rather than running an open loop. That is, the controller circuitry 218 controls operation of various components of the radar unit 214 to acquire visualization information as described in more detail herein, such as to visualize one or more characteristics of the furrow. In some examples, the radar unit 214 acquire spatial information and the controller circuitry 218 takes the spatial/time domain information and converts the information into a point cloud to be further analyzed and transformed into a visual representation as described in more detail herein.

It should be noted that the radar unit 214 can be coupled to the planting device (e.g., the seeding unit 112) using any suitable mounting or attachment arrangement. In some examples, the radar unit 214 is coupled to the planting device using one or more mounting components or brackets that fixedly mounts the radar unit 214 to the planting device (e.g., fixed position and orientation). FIG. 5 illustrates a coupling between the planting vehicle and the radar unit 214, namely a mounting arrangement to an undercarriage portion of the planting vehicle. In some examples, the radar unit 214 is coupled to be orthoplanar to the furrow and behind the seed emergence point. In various examples, the system 200 is operably or communicatively coupled to other components or systems, such as to a seed drop sensor that uses vehicle speed to time when the dropped seed is in the center of the visualization frame to provide synchronized operation in a closed loop instead of an open loop.

It should be noted that one or more other components are included in some examples, such as a base plate heat sink mounting component, a synchronization board, a sensor coupled circuit board, a sensor lens mounting component, an sensor lens, a radar apparatus covering component, and a shielding component, etc.

Referring again to FIG. 4, the furrow analyzing processor 204 further includes a processor controller 220, storage 222 (e.g., RAM and/or ROM memory), a depth detection sub-system 224, a seed placement sub-system 226, a furrow integrity sub-system 228, and a furrow refuse characterization sub-system 230. Each of the sub-systems 224, 226, 228, and 230 is configured to use the acquired visualization information (e.g., information or data acquired by the radar unit 214) or one or more pulses or data collection events to perform one or more analyses to determine one or more structure, shape, and/or soil composition characteristics of the created furrow (e.g., furrow monitoring or imaging), which in some examples is performed in real-time during a planting process of the planting vehicle. It should be noted that some processing (e.g., image data preprocessing) is performed by a processor 232 of the visualization apparatus 202 in some examples. It should also be noted that in one or more examples, visualizations and determined metrics as described herein are tagged during registration with GPS information from the GPS device 206 to allow, for example, for producing a field map.

Figure 6:
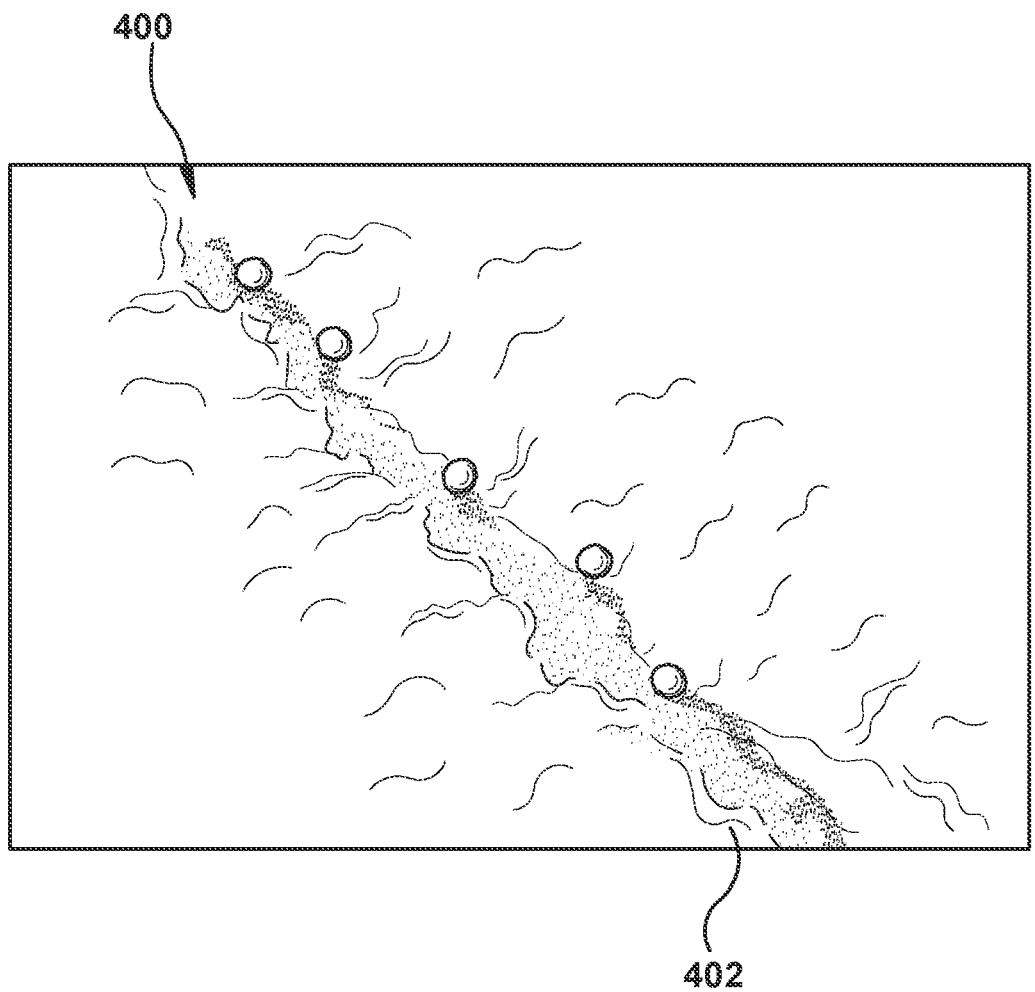
FIG. 6 is a diagram illustrating a furrow that can be analyzed and visualized according to various examples.

In operation, the furrow analyzing processor 204 is configured to analyze acquired visualization information and perform at least one or more of depth detection, seed placement analysis, furrow integrity analysis, and/or furrow refuse characterization analysis. That is, one or more of furrow characteristics are determined by the analysis performed by sub-systems 224, 226, 228, and 230, which may include, but are not limited to, amounts of debris, seed placement, fertilizer placement, furrow shape, and furrow depth. In some examples, the controller circuitry 218 is operably coupled to and configured to control data acquisition by the radar sensor 216, which can include a plurality of radar devices. In one example, the radar devices of the radar sensor 216 are controlled to generate a point cloud data set associated with an opened furrow 400 as illustrated in FIG. 6, wherein each point of the data set contains a position and a Doppler velocity. A plurality of structure-from-motion algorithms are then used in some examples to generate a visual representation of the furrow 400 based on the point cloud data set and one or more vehicle parameters such as, but not limited to, forward vehicle motion, as described in more detail herein. The generated image is the processed to analyze, for example, for seed depth, furrow profile, and/or seed placement for seeds 402. As such, in various examples, computer vision using radar sensing allows the furrow analyzing processor 204 to perform analysis of the soil from furrow opening to furrow closing to generate a visualization of the furrow 400.

In various examples, a plurality of point clouds are generated and stacked over time and a long-tail analysis is used to visualize the furrow 400. For example, successive point clouds are stacked (e.g., summed) together with positional/velocity data to form 'structure from motion' 3D clouds. In some examples, an analysis is then performed to determine the structure of the furrow 400, such as if the furrow 400 is open, closed, or collapsed, and the shape of the furrow 400. Other visualizations can be generated from the acquired point clouds, such as the pose of the seeds 402 within the furrow 400. In some examples, data and/or visualization information can be saved for future agronomic uses, instead of being deleted or discarded.

Figure 7:
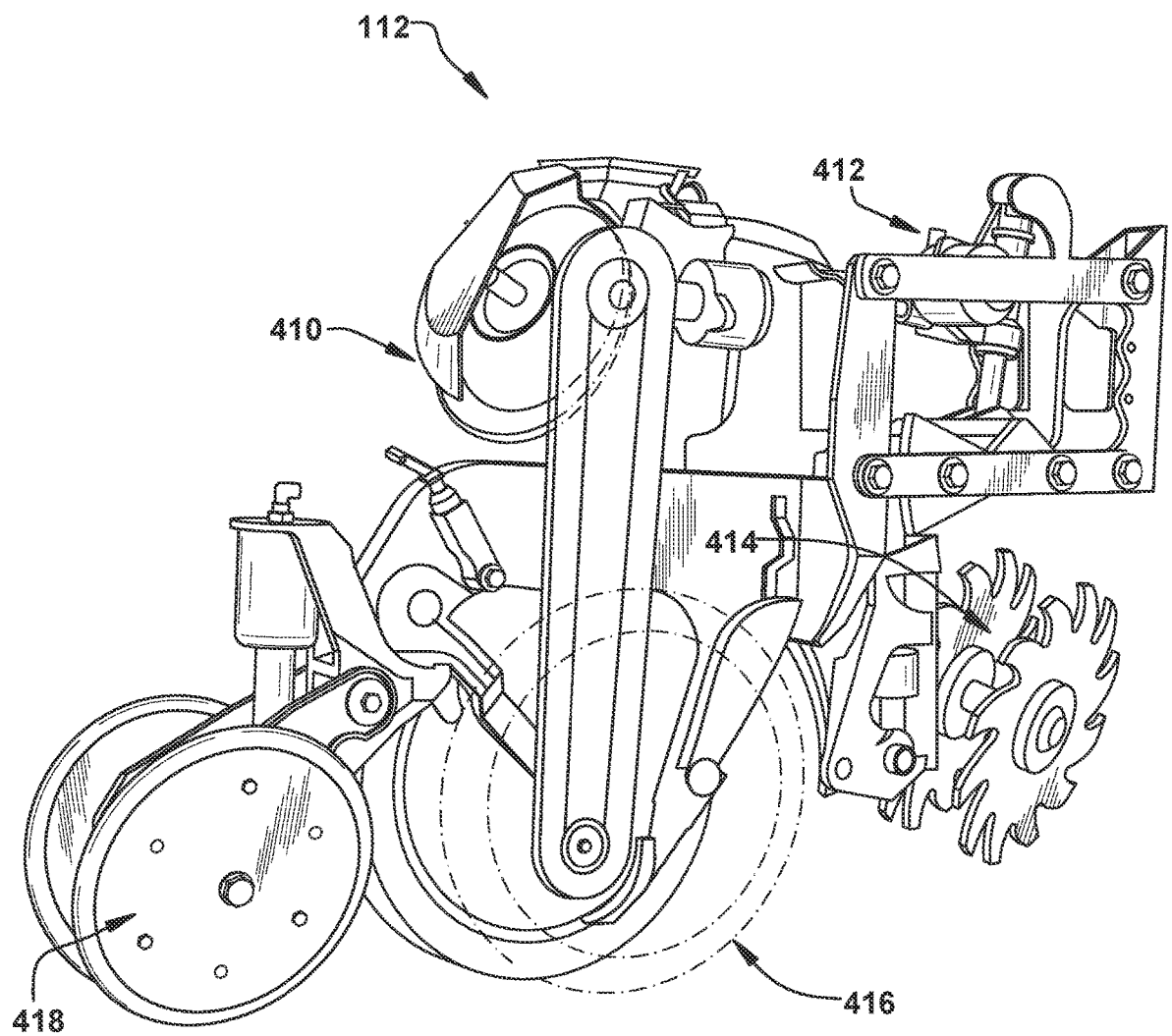
FIG. 7 is a diagram illustrating different operating parameters of an agricultural device controllable according to one implementation.

With the generated visualization, one or more planting characteristics or properties are controlled in various examples such as illustrated in FIG. 7, showing a planting device. However, it should be appreciated that different devices are controllable, such as a firmer. In some examples, one or more of planting speed, seeding rate, applied row unit downforce, row cleaner aggressiveness, planting depth, and furrow closing force are set or adjusted based on the furrow analysis performed as described herein. As an example, as soil conditions change throughout the day when planting, one or more of the planting speed, seeding rate, applied row unit downforce, row cleaner aggressiveness, planting depth, and furrow closing force are changed based on point cloud analysis as described herein. It should be noted that the parameters or settings that are changed are illustrated relative to one or more components of the seeding unit 112 that are adjusted. That is, the seeding rate is controlled by a seeder 410, the applied row unit downforce is controlled by a pressure (e.g., hydraulic pressure) system 412, the row cleaner aggressiveness in controlled by one or more cleaning wheels 414, the planting depth is controlled by a gage wheel 416, and the furrow closing force is controlled by one or more furrow closing wheels 418. Any combination of the components can be controlled to adjust a respective operating parameter or condition relating to planting speed, seeding rate, applied row unit downforce, row cleaner aggressiveness, planting depth, and furrow closing force. Additional components or controls are contemplated, such as to adjust one or more furrow or planting conditions and the illustrated components and adjustable parameters are merely for example.

Figure 8:
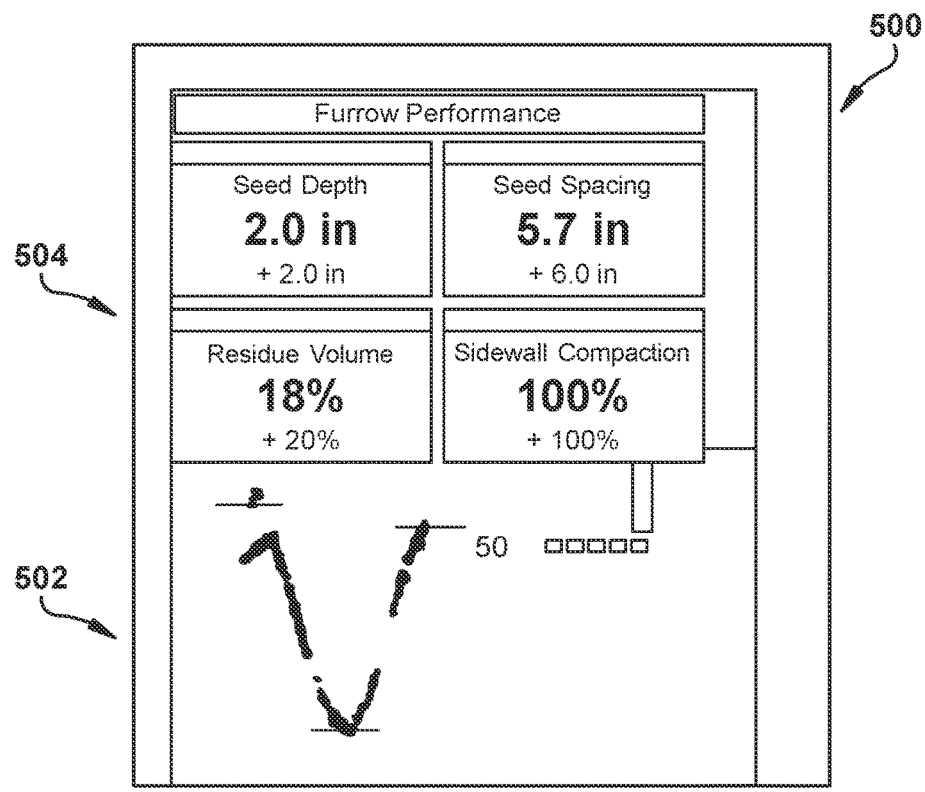
FIG. 8 is a diagram of a user interface according to one implementation.
Figure 9:
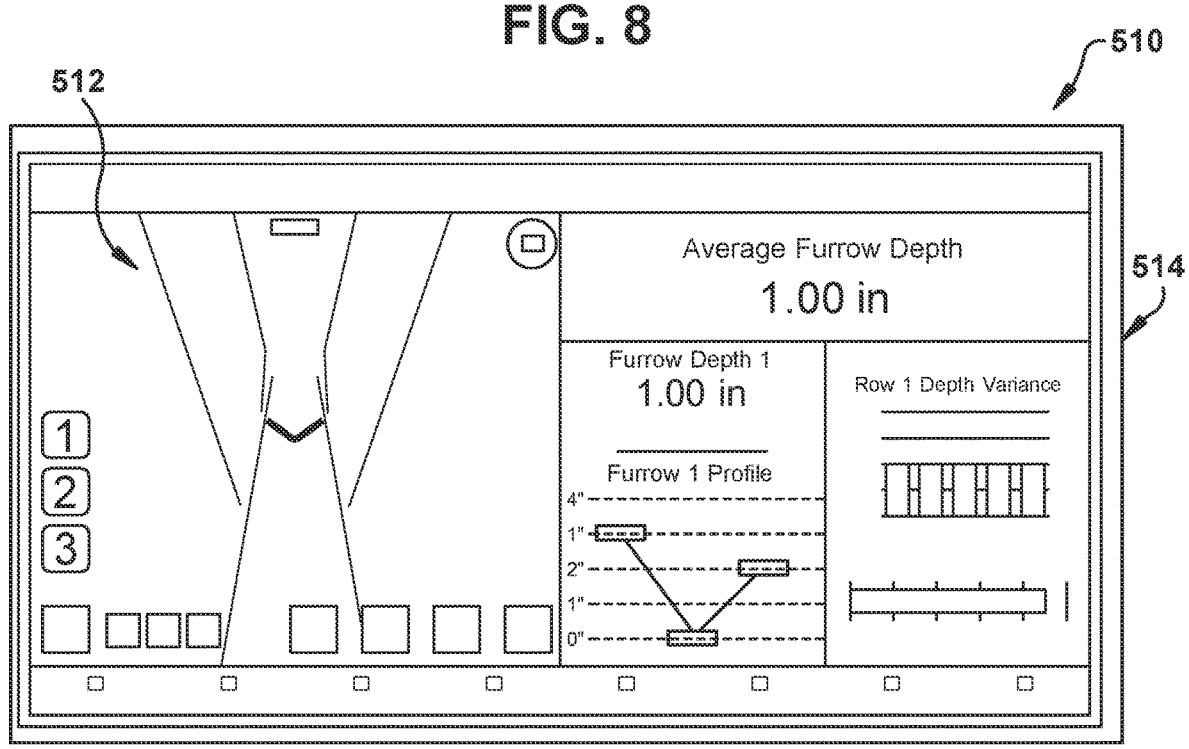
FIG. 9 is a diagram of another user interface according to one implementation.

In operation, with the system 200 installed and communicatively coupled to, for example, the vehicle 100 (e.g., radar sensor 216 active and software operating), during planting, the vehicle 100 traverses different soil conditions, types, etc. That is, in different portions or the field, in different fields, on different days, at different times of day, etc., soil and/or planting conditions can vary or change. As such, one or more original settings for planting or seeding may no longer provide optimal planting or seeding later in the day or on a different portion of the field (e.g., an initial setting of two inch planting depth, ten miles per hour (mph) speed, and 200 pounds of downforce may not create a furrow at a different time or on a different field having desired properties). With one or more examples, a visualization that allows adjustments, for example, in real-time or dynamically on the fly are provided without having to visually inspect the furrow with the vehicle 100 stopped. That is, from the cab of the vehicle 100, a visualization of one or more planting or seeding characteristics, such as amounts of debris, seed placement, fertilizer placement, furrow shape, furrow depth, etc. are presented to the user, such as with the user interface 500 illustrated in FIG. 8 or the user interface 510 illustrated in FIG. 9. It should be noted that the user interfaces 500 and 510 are merely examples of the types of visualizations and metrics that can be generated and displayed using one or more examples described herein. The user interfaces 500 and 510 in various examples can be any type of remote user interface, such as a display in a cab of a vehicle, a tablet device located at the edge of a field or at a home office, etc.

As can be seem, the user interfaces 500 and 510 display visualizations 502 and 512, respectively of the furrow being created. That is, a point cloud representation of the V-shaped furrow is displayed by the user interfaces 500 and 510. The visualization 502 shows a graphical representation of the processed and analyzed data points (e.g., radar or electromagnetic spectrum data) acquired by the visualization apparatus 202 corresponding to the created furrow. Similarly, the visualization 512 shows a graphical representation of the processed and analyzed data points (e.g., radar or electromagnetic spectrum data) acquired by the visualization apparatus 202 corresponding to the created furrow, but with a straight line representation of the walls of the furrow. It should be noted that a point cloud generally refers to a set of data points in space, in these examples, the three-dimensional (3D) space in the ROI of the radar sensor 216 that includes the furrow 400 (and other object therein, such as seeds 402). The visualizations 502 and 512 correspond to points that represent a 3D shape or object, namely the furrow 400 and any seeds 402. Each point position has a corresponding set of Cartesian coordinates (X, Y, Z) used by one or more examples to generate the visualizations 502 and 512. It should be noted that the point cloud data and one or more examples described herein can be used to create different types of visualizations, animations, renderings, etc., such as related to the furrow 400 and characteristics or metrics thereof (e.g., quality metrics).

Thus, the visualizations 502 and 512 are the point cloud representations of the shape of the furrow 400, namely the point cloud of the radar data acquired by the radar sensor 216. It should be noted that displaying the visualizations 502 and 512 is optional in various examples, and the planter or other agricultural device can make one or more adjustments without showing the visualizations 502 and 512 on a screen to the operator. One or more examples of the user interfaces 500 and 510 also display metrics 504 and 514 corresponding to the furrow 400. That is, the analyzed radar data is used to generate one or more metrics that are displayed by the user interfaces 500 and 510. For example, the user interface 500 displays seed depth, seed spacing, residue volume, and sidewall compaction as the metrics 504. The user interface 510 displays average furrow depth, depth variance, a furrow profile graph, and compaction data as the metrics 514. The type of data and manner in which the data is displayed can be varied as desired or needed. For example, different metrics, different graphs/charts, etc. can be generated using the herein described furrow analysis.

Figure 10:
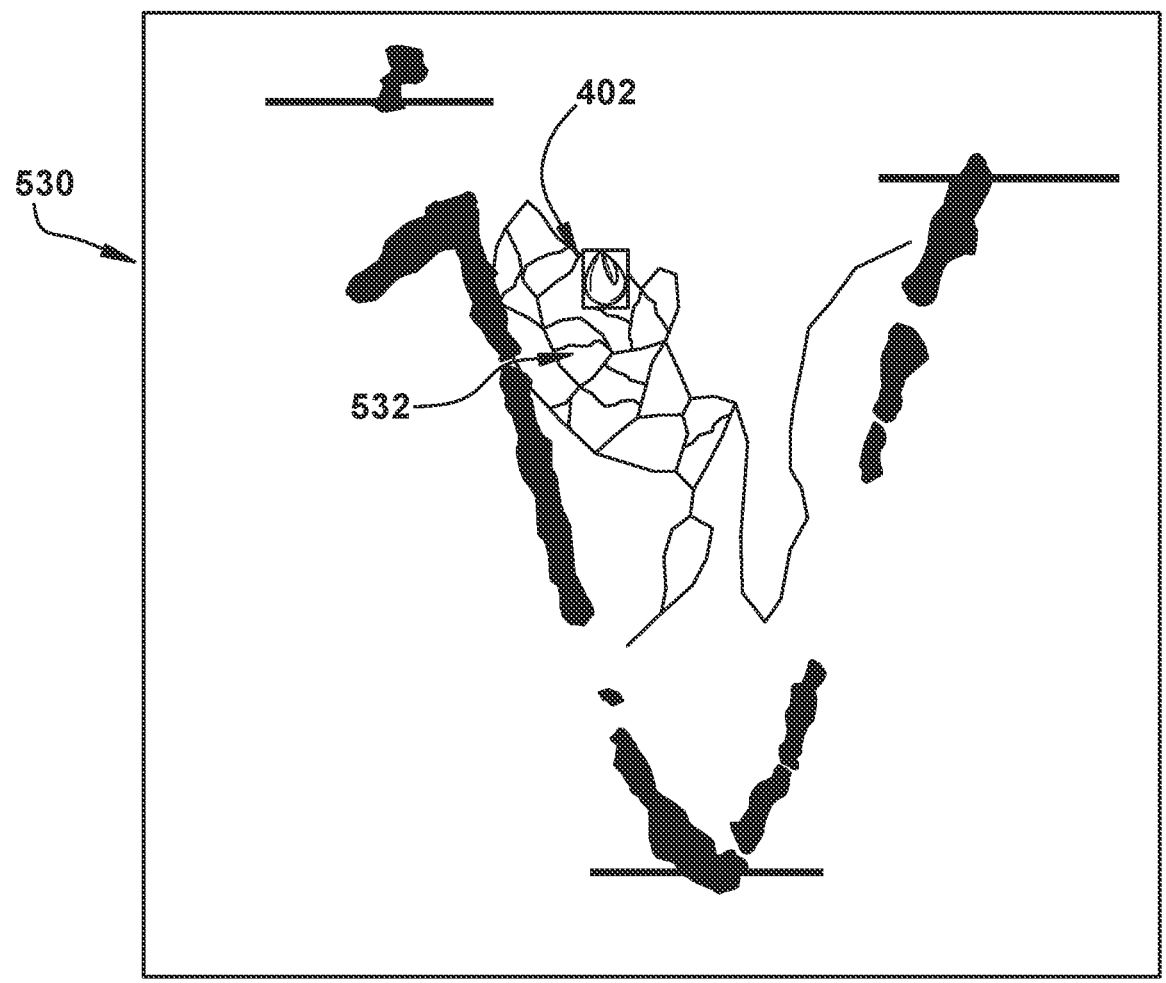
FIG. 10 is a diagram of a visualization illustrating a collapsed furrow according to various examples.

As an example, using the sidewall compaction residue depth and furrow depth metrics, a determination can be made as to an amount of furrow collapse as illustrated in the visualization 530 shown in FIG. 10. As can be seen, a collapsed visualization portion 532 corresponds to a collapsed portion of the furrow 400, and from this, a percentage of collapse can be determined, such as at the locations where seeds 402 are being placed. In one example, a setting (e.g., user setting) defines an 80% collapse threshold, wherein the visualization 530 appears collapsed and at this level of collapse the seed 402 is not being positioned at the bottom of the furrow 400. It should be appreciated that in various examples, the point cloud analysis performed herein allows for visualization of the seed 402 (distinguished from other objects, such as rocks). The threshold value is set in this example at 80%, which is identified or determined to result in uneven emergence because of improper seed placement when the value is exceeded. The threshold value can be varied as desired or needed, such as based on user input, machine learning, empirical data, etc.

Continuing with the 80% collapse example, when the visualization 502, 512, 530 and/or the metrics 504, 514 indicate a collapse of 80% or more, one or more of the planting or operating parameters are adjusted to reduce the collapse of additionally created furrows 400. That is, one or more adjustments can be made to reduce or attempt to reduce the amount of collapse of the furrow 400. For example, the planting speed is decreased from 10 mph to 7 mph and the row unit down force is increase by 10%. As should be appreciated, with the radar sensor operating at 60 GHz, a point cloud is generated every $1/10^{th}$ of a second. As such, the visualization 500, 510, 530 and/or the metrics 504, 514 begin to be updated based on the new point cloud data, which can be combined with at least some of the past or historical point cloud data. It should be noted that the operation parameters are merely for example and based in some examples on the noise filtering from the radar. As such, in some examples, planting can be performed at upwards of fifty seeds per second, which is performed with the radar sensor 216 operating at a higher frequency.

In some examples, historical data can be used in the adjustments or setting, such as of the threshold. In various examples, one or more data metrics generated as described herein are overlaid on a crop yield map that allows for identifying reduced yield and the corresponding collapse percentage determine by the point cloud data and analysis. For example, if a determination is made that at location where furrow collapse is greater than 70%, yield is reduced (e.g., reduced by five bushels or more), the threshold is set (e.g., automatically by the system 200 or based on a user input) to a 70% furrow collapse value. The values, such as one or more thresholds can be varied from time to time. In one example, the yield map is based on annual crop data and, as such, the threshold is value is then adjusted to an initial value the next crop year, such as to the 70% furrow collapse value. Accordingly, in response to the furrow collapse value exceeding 70%, one or more adjustments are then made, for example to speed and/or downforce to maintain the furrow collapse value below 70% based on the acquired point cloud data as described in more detail herein. It should be noted that in some examples the speed and/or downforce are manually adjusted based on user input and in other examples are adjusted automatically based on machine learning or other artificial intelligence of the system 200 (e.g., self-learning that self-calibrates).

As another example, a larger model is generated based on assembled point cloud data. In particular, as a frame N, knowing the GPS location from the GPS device 206 and the ground speed of the vehicle 100, the offset of frame N from frame 0 (where the plating row started) can be determined. The point cloud data is thereby assembled into a larger model on which a bifurcated algorithm is performed in some examples, where one algorithm tries to fit sidewalls of the furrow 400 and detect a percent collapse of the furrow 400. The resultant output is fed back into the system 200 and the secondary algorithm processes the data to determine the location of a "bump" of seed in the point cloud (e.g., corn seed identified at 5 mm granularity with the radar sensor 216 operating at wavelength at 60 GHz, and with some additional processing using Doppler information, granularity can be to a quarter of wavelength). With this information, a determination can be made to the spacing between seeds 402 to ensure proper spacing between placed seeds. It should be noted that point cloud data is acquired every $1/10$ second in this example and the point cloud is 3D with optional Doppler. As such, in some examples, the X, Y, Z point cloud data is used to build a larger model (e.g., at 10 Hz to generate 3D snapshots of what the V-shaped furrow looks like). It should be noted that the operating frequency of the radar sensor 216 is merely for example.

It should be appreciated single or multiple algorithms can be used in the various examples to analyze the data, such a point cloud data set associated with an opened furrow generated by one or more radar devices, wherein each point of the data set contains a position and a Doppler velocity. A plurality of structure-from-motion algorithms are used in some examples to generate an image of the furrow based on the point cloud data set and one or more vehicle parameters such as, but not limited to, forward vehicle motion. The generated image is processed in some examples to analyze, for example, for seed depth, furrow profile, and seed placement.

In one or more examples, the point cloud analysis uses one or more features of the point cloud data to determine different properties or metrics of the furrow 400. For example, blurred furrow edges represent poor sidewall stability.

Thus, one or more examples provide precision sensing using a different portion of electromagnetic spectrum, namely the millimeter wavelength portion of the spectrum. That is, various examples operate outside of the optical portion of the spectrum and allow for accurate furrow visualization, such for furrow mensuration, a determination of whether moisture is needed, a determination of whether an object is a seed or a rock, etc. As such, non-visual reliable furrow analysis is provided in various examples that allows for optimizing furrow quality using point cloud data and metrics acquired with radar. In some examples, using other features of the RF energy, such as signal to noise ratio, a combination of crumbly/dryness of the soil can be determined. One or more parameters or operating characteristics can thereby be controlled or adjust based on the analyzed furrow characteristics, as well as to provide feedback to operator. One or more of the herein described examples allow for analyzing and processing job quality of the furrow when planting seed.

It should be noted that one or more examples can be implemented using different wavelength spectrums. That is, while radar implementations are described herein, other sensing techniques can be used, such as LIDAR, to analyze the furrow, which allows for understanding and/or visualizing planting quality and furrow quality. Additionally, the analysis can be used for different applications, such as for liquid application identification via millimeter wave radar to detect a distinguishing characteristic of the applied material or liquid based on dielectric differences between the applied material and the soil, to thereby confirm liquid placement. That is, one or more examples perform furrow visualization and/or liquid application identification via millimeter-wave radar.

Figure 11:
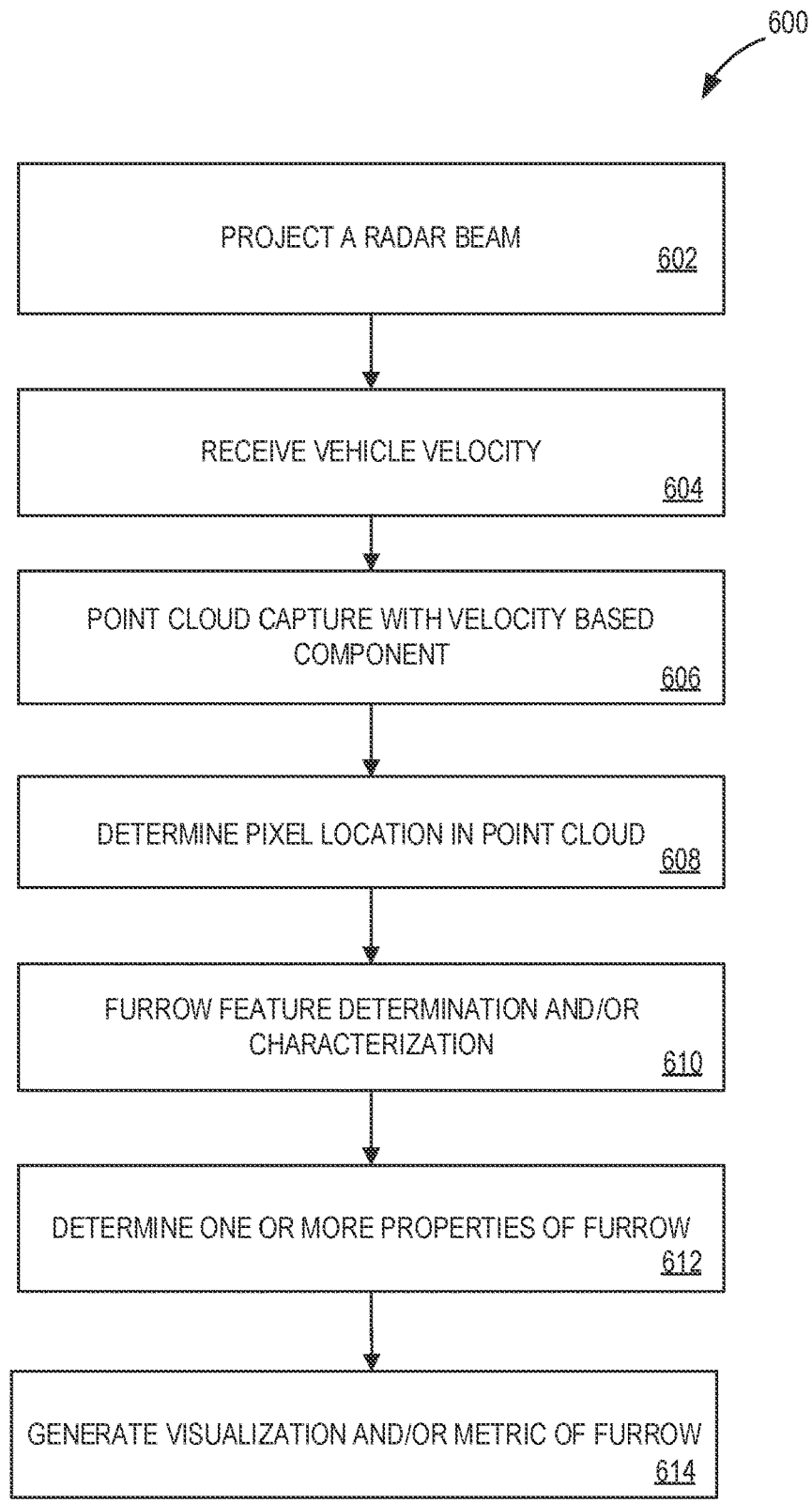
FIG. 11 illustrates an example of a method for furrow analysis and visualization according to one implementation.

Accordingly, various examples provide furrow analysis and visualization, such as using cloud-point data generated using millimeter-wave radar that allows for control of planting or seeding operations for improved or more optimized results as illustrated in the flowchart 600 of FIG. 11. That is, the flowchart 600 illustrates operations involved in configuring one or more components for planting or seeding (e.g., for furrow generation), to improve planting or seeding operations, particularly furrow creation operations, according to one or more implementations. In some examples, the operations of the flowchart 600 are performed using one or more configurations described in more detail herein. In some examples, the flowchart 600 performs, with respect to the furrow 400, depth determination processing, seed placement processing, furrow integrity determination, etc.

The flowchart 600 commences at 602, which includes projecting a radar beam, such as using the radar sensor 216 operating at one or more millimeter-wave frequencies. That is, the radar is configured and operated for sensing within the millimeter-wave range of frequencies to determine one or more of furrow characteristics which may include, but are not limited to, amounts of debris, seed placement, fertilizer placement, furrow shape, and furrow depth, in some examples. The radar sensor 216 is positioned in relation to the planting device and ground surface to allow for acquiring point cloud data. That is, one or more radar devices, such as the radar sensor 216, generate a point cloud data set associated with an opened furrow, wherein each point of the data set contains a position and a Doppler velocity in various examples.

At 604, vehicle velocity data is received. As descried in more detail herein, the velocity of the vehicle performing the planting or seeding is acquired, such as from the speed measuring system of the vehicle (e.g., speedometer of the vehicle 100). Other data can be acquired in various examples, such as GPS data from the GPS device 206. In some examples, the vehicle velocity data (or other data) is correlated or associated with the radar data in time (e.g., time-stamped and stored in memory).

A point cloud capture with a velocity based component is performed at 606. For example, as described herein, point cloud data associated with the furrow 400 scanned by the radar sensor 216 is generated based on the millimeter-wave radar signals of the radar sensor 216. In some examples, a plurality of point cloud data sets can be combined to generate different models that can then be used to determine point locations with the point cloud. For example, pixel locations (e.g., X, Y, Z locations) within the point cloud for the generated data is determined at 608. That is, using point cloud processing techniques, such as one or more algorithms described herein, pixel location from the point cloud capture is used and analyzed to perform furrow feature determination and/or characterization at 610. For example, as described herein, one or more features or characteristics of the furrow 400, the seeds 402, or related features or characteristics are analyzed, such that one or more properties thereof, such as amounts of debris, seed placement, fertilizer placement, furrow shape, and furrow depth, are determined at 612. That is, point cloud data associated with an opened furrow are analyzed to generate a visualization or image, and/or metrics, relating to the furrow 400 at 614. As described herein, the visualization(s) and/or metric(s) are displayed to the user or operator (e.g., operator of the vehicle 100) via one or more user interfaces.

Thus, various examples provide improved planting or seeding operation using furrow analysis and visualization. As such, more seeds can be properly and/or accurately dispersed within the ground.

Figure 12:
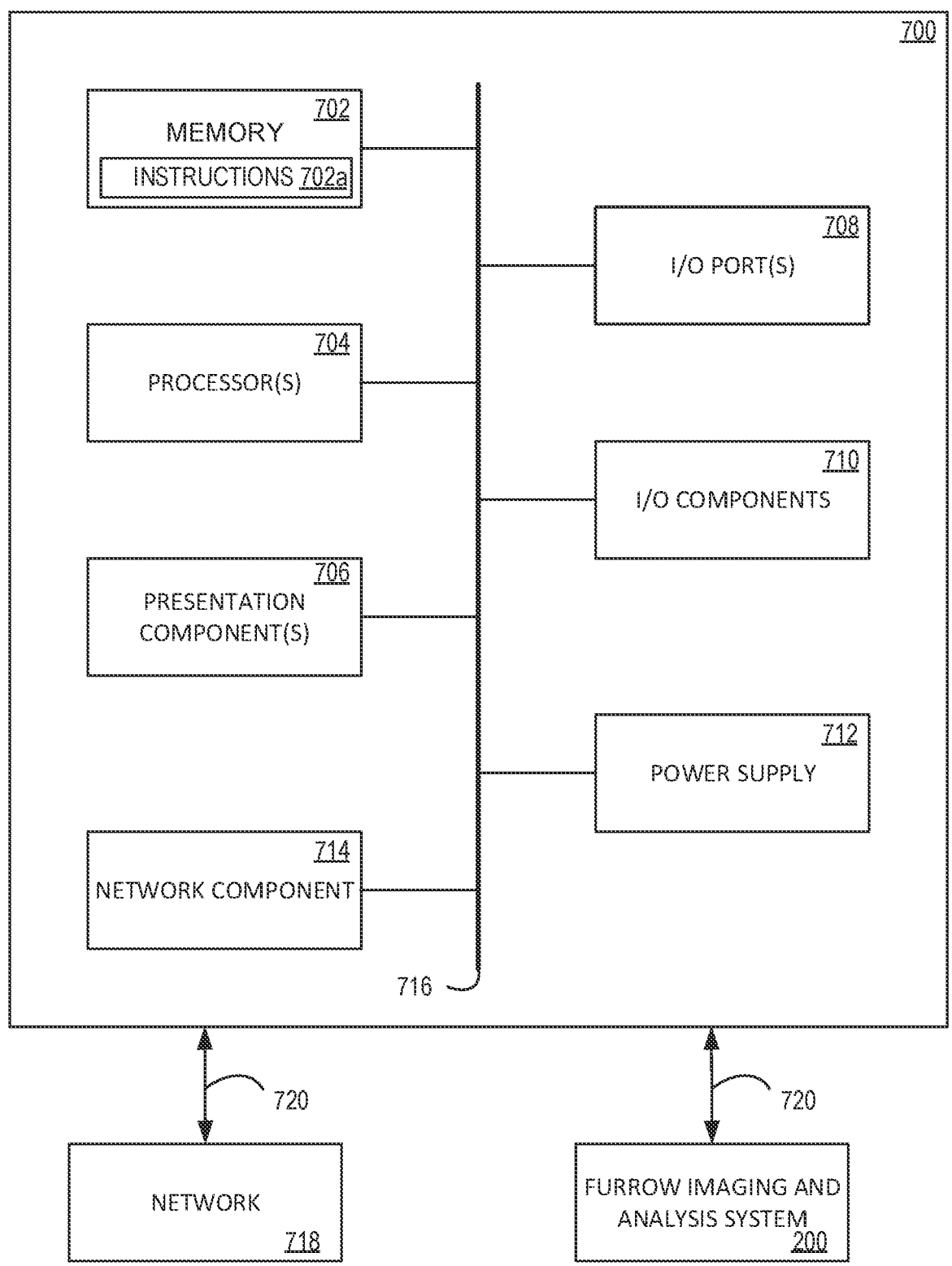
FIG. 12 is a block diagram of an example computing environment suitable for implementing various examples.

With reference now to FIG. 12, a block diagram of a computing device 700 suitable for implementing various aspects of the disclosure as described (e.g., operations or functions for furrow analysis and visualization generation). FIG. 12 and the following discussion provide a brief, general description of a computing environment in/on which one or more or the implementations of one or more of the methods and/or system set forth herein may be implemented. The operating environment of FIG. 12 is merely an example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, mobile consoles, tablets, media players, and the like), multiprocessor systems, consumer electronics, mini computers, mainframe computers, distributed computing environments that include any of the above systems or devices, and the like.

Although not required, implementations are described in the general context of "computer readable instructions" executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

In some examples, the computing device 700 includes a memory 702, one or more processors 704, and one or more presentation components 706. The disclosed examples associated with the computing device 700 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 12 and the references herein to a "computing device." The disclosed examples are also practiced in distributed computing environments, where tasks are performed by remote-processing devices that are linked through a communications network. Further, while the computing device 700 is depicted as a single device, in one example, multiple computing devices work together and share the depicted device resources. For instance, in one example, the memory 702 is distributed across multiple devices, the processor(s) 704 provided are housed on different devices, and so on.

In one example, the memory 702 includes any of the computer-readable media discussed herein. In one example, the memory 702 is used to store and access instructions 702*a* configured to carry out the various operations disclosed herein. In some examples, the memory 702 includes computer storage media in the form of volatile and/or nonvolatile memory, removable or non-removable memory, data disks in virtual environments, or a combination thereof. In one example, the processor(s) 704 includes any quantity of processing units that read data from various entities, such as the memory 702 or input/output (I/O) components 710. Specifically, the processor(s) 704 are programmed to execute computer-executable instructions for implementing aspects of the disclosure. In one example, the instructions 702*a* are performed by the processor 704, by multiple processors within the computing device 700, or by a processor external to the computing device 700. In some examples, the processor(s) 704 are programmed to execute instructions such as those illustrated in the flow charts discussed herein and depicted in the accompanying drawings.

In other implementations, the computing device 700 may include additional features and/or functionality. For example, the computing device 700 may also include additional storage (e.g., removable and/or non-removable) including, but not limited to, magnetic storage, optical storage, and the like. Such additional storage is illustrated in FIG. 12 by the memory 702. In one implementation, computer readable instructions to implement one or more implementations provided herein may be in the memory 702 as described herein. The memory 702 may also store other computer readable instructions to implement an operating system, an application program and the like. Computer readable instructions may be loaded in the memory 702 for execution by the processor(s) 704, for example.

The presentation component(s) 706 present data indications to an operator or to another device. In one example, the presentation components 706 include a display device (e.g., within the cab of the vehicle 100), speaker, printing component, vibrating component, etc. One skilled in the art will understand and appreciate that computer data is presented in a number of ways, such as visually in a graphical user interface (GUI), audibly through speakers, wirelessly between the computing device 700, across a wired connection, or in other ways. In one example, the presentation component(s) 706 are not used when processes and operations are sufficiently automated that a need for human interaction is lessened or not needed. I/O ports 708 allow the computing device 700 to be logically coupled to other devices including the I/O components 710, some of which is built in. Implementations of the I/O components 710 include, for example but without limitation, a microphone, keyboard, mouse, joystick, pen, game pad, satellite dish, scanner, printer, wireless device, camera, etc.

The computing device 700 includes a bus 716 that directly or indirectly couples the following devices: the memory 702, the one or more processors 704, the one or more presentation components 706, the input/output (I/O) ports 708, the I/O components 710, a power supply 712, and a network component 714. The computing device 700 should not be interpreted as having any dependency or requirement related to any single component or combination of components illustrated therein. The bus 716 represents one or more busses (such as an address bus, data bus, or a combination thereof). Although the various blocks of FIG. 12 are shown with lines for the sake of clarity, some implementations blur functionality over various different components described herein.

The components of the computing device 700 may be connected by various interconnects. Such interconnects may include a Peripheral Component Interconnect (PCI), such as PCI Express, a Universal Serial Bus (USB), firewire (IEEE 1394), CANBUS, etherCAT, etc., an optical bus structure, and the like. In another implementation, components of the computing device 700 may be interconnected by a network. For example, the memory 702 may be comprised of multiple physical memory units located in different physical locations interconnected by a network.

In some examples, the computing device 700 is communicatively coupled to a network 718 using the network component 714. In some examples, the network component 714 includes a network interface card and/or computer-executable instructions (e.g., a driver) for operating the network interface card. In one example, communication between the computing device 700 and other devices occurs using any protocol or mechanism over a wired or wireless connection 720. In some examples, the network component 714 is operable to communicate data over public, private, or hybrid (public and private) connections using a transfer protocol, between devices wirelessly using short range communication technologies (e.g., near-field communication (NFC), Bluetooth® branded communications, or the like), or a combination thereof.

The connection 720 may include, but is not limited to, a modem, a Network Interface Card (NIC), an integrated network interface, a radio frequency transmitter/receiver, an infrared port, a USB connection or other interfaces for connecting the computing device 700 to other computing devices. The connection 720 may transmit and/or receive communication media. In some examples, the connection 720 allows communication with the system 200, configured as a furrow imaging and analysis system to allow improved planting or seeding operations. In various examples, the computing device 700 in combination with the system 200 transmits one or more control signals to control one or more settings or operations for planting and/or seeding as described herein.

Although described in connection with the computing device 700, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure, such as controllers or monitors, are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprises computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

The word "exemplary" is used herein to mean serving as an example, instance or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

Various operations of implementations are provided herein. In one implementation, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each implementation provided herein.

Any range or value given herein can be extended or altered without losing the effect sought, as will be apparent to the skilled person.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

As used in this application, the terms "component," "module," "system," "interface," and the like are generally intended to refer to a computer-related entity, either hardware, a combination of hardware and software, software, or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device, carrier or media. Of course, those skilled in the art will recognize many modifications may be made to this configuration without departing from the scope or spirit of the claimed subject matter.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A system for furrow visualization, the system comprising:
   a radar sensor configured to be coupled to a planting vehicle and acquire data relating to a furrow being created;
   a visualization apparatus communicatively coupled to the radar sensor and configured to generate a point cloud of the furrow; and
   a furrow analyzing processor configured to analyze the point cloud and generate a visualization of the furrow, wherein the furrow analyzing processor comprises a depth detection sub-system, a seed placement sub-system, a furrow integrity sub-system, and a furrow refuse characterization sub-system, the depth detection sub-system, the seed placement sub-system, the furrow integrity sub-system, and the furrow refuse characterization sub-system together processing the visualization of the furrow to analyze for one or more of seed depth, furrow profile, and seed placement.

2. The system of claim 1, wherein the radar sensor comprises a millimeter-wave radar device mounted to an undercarriage portion of the planting vehicle.

3. The system of claim 1, further comprising a user interface displaying the visualization of the furrow and one or more metrics related to the visualized furrow.

4. The system of claim 3, further comprising a controller configured to adjust one or more settings relating to operation of the planting vehicle based on at least one of the visualization of the furrow and the one or more metrics related to the visualized furrow.

5. The system of claim 4, wherein the one or more metric comprises a furrow collapse percentage and the one or more settings are adjusted in response to the furrow collapse percentage exceeding a threshold value.

6. The system of claim 4, wherein the controller is configured to automatically adjust the one or more settings using self-learning allowing self-calibration of the one or more settings.

7. The system of claim 1, wherein the radar sensor comprises a radar device operating in a non-optical electromagnetic frequency spectrum.

8. The system of claim 1, further comprising a controller configured to adjust one or more settings relating to operation of the planting vehicle based on the visualization of the furrow, the one or more settings comprising a planting speed, a seeding rate, an applied row unit downforce, a row cleaner aggressiveness, a planting depth, and a furrow closing force.

9. The system of claim 1, further comprising a user interface displaying at least one of the visualization of the furrow and one or more metrics related to the visualized furrow, the visualization representing a shape profile of the furrow.

10. The system of claim 1, wherein the furrow analyzing processor is configured to analyze the point cloud to distinguish between a seed in the furrow and other objects in the furrow.

11. The system of claim 1, wherein the other objects comprise debris including rocks.

12. The system of claim 1, wherein the furrow analyzing processor is configured to analyze the point cloud to identify one or more collapsed portions of the furrow and display the identified one or more collapsed portions as a collapsed visualization portion.

13. The system of claim 1, further comprising a user interface displaying the visualization of the furrow and one or more metrics related to the visualized furrow, the one or more metrics generated from the point cloud of the furrow and related to at least one of a seed bed and a seed depth of the furrow.

14. A planting device comprising:
   a frame;
   a plurality of seeding units coupled to the frame;
   a radar sensor coupled to an undercarriage of one or more units of the plurality of seeding units and configured to acquire data relating to a furrow being created;
   a visualization apparatus communicatively coupled to the radar sensor and configured to generate a point cloud of the furrow using the acquired data; and
   a furrow analyzing processor configured to analyze the point cloud to identify one or more collapsed portions of the furrow, generate a visualization of the furrow, and display the identified one or more collapsed portions as a collapsed visualization portion.

15. The planting device of claim 14, further comprising a vehicle coupled to the frame and configured to move the plurality of seeding units, the vehicle having a remote user interface, wherein the remote user interface is configured to display the visualization of the furrow.

16. The planting device of claim 14, wherein the radar sensor comprises a millimeter-wave radar device.

17. A method for furrow analysis and visualization, the method comprising:
   projecting a radar beam under a planting vehicle creating a furrow;

receiving velocity information for the planting vehicle;
capturing a point cloud of the furrow using the radar beam with a velocity component based on the velocity information;
determining one or more features of the furrow using the captured point cloud;
generating a visualization of the furrow based on the determined one or more features;
displaying, on a user interface, the visualization of the furrow and one or more metrics related to the furrow, wherein the one or more metrics comprise a furrow collapse percentage; and
adjusting one or more settings related to operation of the planting vehicle based on at least one of the visualization of the furrow and the one or more metrics related to the furrow, wherein the one or more settings are adjusted in response to the furrow collapse percentage exceeding a threshold value.

18. The method of claim 17, further comprising analyzing the point cloud to identify one or more collapsed portions of the furrow.

19. The method of claim 18, wherein displaying the visualization of the furrow includes displaying the identified one or more collapsed portions as a collapsed visualization portion.

* * * * *